United States Patent
Chang et al.

(10) Patent No.: US 9,590,492 B2
(45) Date of Patent: Mar. 7, 2017

(54) SYSTEM AND METHOD FOR A SWITCHED-MODE POWER SUPPLY

(71) Applicant: Infineon Technologies Austria AG, Villach (AT)

(72) Inventors: Chia Jui Chang, New Taipei (TW); Jheng Bin Huang, New Taipei (TW); Jin Hung Lin, Taipei (TW)

(73) Assignee: Infineon Technologies Austria AG, Villach (AT)

( * ) Notice: Subject to any disclaimer, the term of this patent is extended or adjusted under 35 U.S.C. 154(b) by 137 days.

(21) Appl. No.: 14/575,429

(22) Filed: Dec. 18, 2014

(65) Prior Publication Data

US 2016/0181927 A1 Jun. 23, 2016

(51) Int. Cl.
| | |
|---|---|
| *H02M 1/36* | (2007.01) |
| *H02M 1/42* | (2007.01) |
| *H02M 3/335* | (2006.01) |
| *H02M 1/00* | (2006.01) |

(52) U.S. Cl.
CPC .............. *H02M 1/36* (2013.01); *H02M 1/42* (2013.01); *H02M 3/33576* (2013.01); *H02M 2001/0058* (2013.01)

(58) Field of Classification Search
CPC ........ H02M 1/32; H02M 1/36; H02M 3/3155; H02M 3/3378; H02M 3/3376; H02M 1/083; H02M 2007/4815
USPC .... 363/21.02, 21.03, 24, 25, 49, 56.06, 131, 363/133, 134; 323/901
See application file for complete search history.

(56) References Cited

U.S. PATENT DOCUMENTS

| | | | |
|---|---|---|---|
| 5,949,665 A | 9/1999 | Seong | |
| 6,018,467 A * | 1/2000 | Majid | ............... H02M 3/33523 363/16 |
| 6,737,842 B2 | 5/2004 | Bai et al. | |
| 7,508,175 B2 | 3/2009 | DeWitt et al. | |
| 7,652,945 B2 | 1/2010 | Chu et al. | |
| 8,686,705 B2 | 4/2014 | Yamakoshi et al. | |
| 8,711,580 B2 | 4/2014 | Zhang et al. | |
| 9,178,438 B2 * | 11/2015 | Fu | ..................... H02M 3/33576 |
| 9,184,655 B2 * | 11/2015 | Drda | ....................... H02M 1/36 |
| 9,337,743 B2 * | 5/2016 | Dai | ..................... H02M 3/3353 |

(Continued)

FOREIGN PATENT DOCUMENTS

| | | |
|---|---|---|
| DE | 19635261 A1 | 7/1997 |
| DE | 102012108489 A1 | 3/2013 |

(Continued)

*Primary Examiner* — Adolf Berhane
(74) *Attorney, Agent, or Firm* — Slater Matsil, LLP

(57) ABSTRACT

In accordance with an embodiment, a method of operating a switched-mode power supply includes starting up the switched-mode power supply by applying a first switching signal to a control node of the first switching transistor and a second switching signal to a control node of a second switching transistor, where a duty cycle of the first switching signal is less than a duty cycle of the second switching signal. After starting up the switched mode power supply, the switched mode power supply is operated by applying a third switching signal to the control node of the first switching transistor and a fourth switching signal to the control node of the second switching transistor, where a duty cycle of the third switching signal is substantially equal to a duty cycle of the fourth switching signal.

24 Claims, 8 Drawing Sheets

(56) References Cited

U.S. PATENT DOCUMENTS

| | | | |
|---|---|---|---|
| 9,350,260 B2 * | 5/2016 | Dai | ................. H02M 1/36 |
| 2013/0063984 A1 | 3/2013 | Sandner et al. | |
| 2014/0070776 A1 | 3/2014 | Hsu et al. | |
| 2015/0263629 A1 * | 9/2015 | Stuler | ............... H02M 3/33546 363/21.02 |
| 2015/0280545 A1 * | 10/2015 | Afsharian | ............... H02M 1/36 363/21.02 |

FOREIGN PATENT DOCUMENTS

| | | | |
|---|---|---|---|
| EP | 2528213 A2 | 11/2012 | |
| WO | 03001314 A1 | 1/2003 | |

\* cited by examiner

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is as a power supply for a light emitting diode (LED), such as those used in residential and commercial lighting applications to replace incandescent light bulbs and compact florescent lamps (CFL). In some applications, a SMPS is used to convert an AC line voltage to a DC current in order to power the LED.

SUMMARY OF THE INVENTION

In accordance with an embodiment, a method of operating a switched-mode power supply includes starting up the switched-mode power supply by applying a first switching signal to a control node of the first switching transistor and a second switching signal to a control node of a second switching transistor, such that a duty cycle of the first switching signal is less than a duty cycle of the second switching signal. After starting up the switched mode power supply, the switched mode power supply is operated by applying a third switching signal to the control node of the first switching transistor and a fourth switching signal to the control node of the second switching transistor, such that a duty cycle of the third switching signal is substantially equal to a duty cycle of the fourth switching signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a resonant inductor-inductor-capacitor (LLC) switched-mode power supply. Embodiments of the present invention may also be applied to other switched-mode power supply configurations and other systems and applications including other circuits that switch including, but not limited to power systems and motor control systems.

In an embodiment of the present invention, a resonant LLC switched-mode power supply is powered up by applying asymmetric pulses to an h-bridge circuit coupled to the primary side of power supply. Initially, during starting, the high-side driver receives short pulses corresponding to a small duty cycle, while the low-side driver receives a longer pulses corresponding to a large duty cycle. By turning on the low-side driver for longer periods at startup, the body diode of the low-side transistor is given the opportunity to become reverse-biased, thereby avoiding transients caused by the uncompleted reverse-recovery behavior of the diode. In some embodiments, the switching frequency of the h-bridge control signals may be higher during startup than during normal operation.

Figure 1:
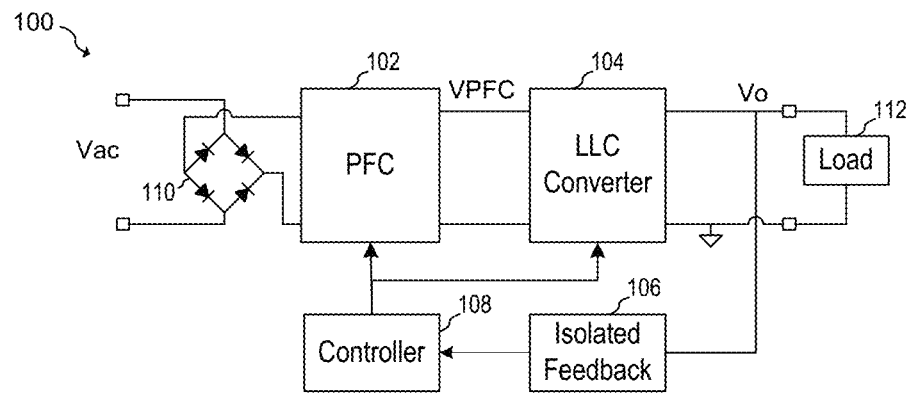
FIG. 1 illustrates an embodiment power supply system.

FIG. 1 illustrates embodiment switched-mode power supply system 100 that may be used to provide power to an electronic system from an AC line voltage. As shown, switched-mode power supply system 100 includes two stages: a power factor correction (PFC) stage 102 followed by a resonant mode switched-more power supply such as an inductor-inductor-capacitor LLC power supply converter 104. Diode bridge rectifier 110 rectifies AC line voltage Vac to provide a rectified line voltage. The PFC stage 102 is configured to convert the rectified line voltage into a DC bus voltage VPFC, while the LLC stage is configured to convert DC bus voltage VPFC into an output voltage Vo to be coupled to a load represented by load block 112. During operation, isolated feedback circuit 106 monitors output voltage Vo and provides feedback to controller 108 that generates switching signals for PFC block 102 and LLC converter 104. In an embodiment, voltage feedback from the output of LLC converter 104 may be used to vary the switching frequency of LLC converter 104 in order to regulate its output voltage Vo. PFC stage 102 in conjunction with controller 108 includes a current control loop that causes the AC input current to PFC 102 to be in phase with AC line voltage Vac. PFC stage 102 and LLC converter 104 may be controlled via controller 108 using control methods and algorithms known in the art. In some embodiments, AC line voltage Vac may be about 110 Vrms or about 220 Vrms with a line frequency of about 60 Hz or about 50 Hz. Alternatively, other line voltages and frequencies may be used.

Figure 2:
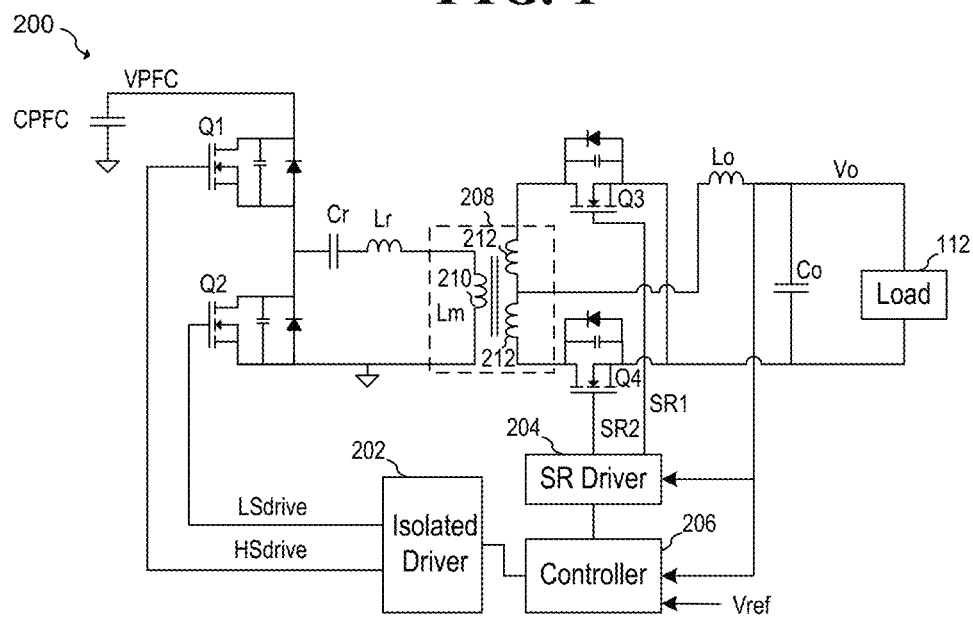
FIG. 2 illustrates an embodiment resonant LLC power converter.

FIG. 2 illustrates a resonant half-bridge LLC converter 200 according to an embodiment of the present invention. This half-bridge topology is often referred to as an LLC power train circuit topology wherein a duty cycle of each primary-side power switch is set to about 50%, and the switching frequency $f_s$ is varied to control an output characteristic such as an output voltage. As switching frequency $f_s$ is varied, the effective gain of the switching converter changes as switching frequency $f_s$ changes in relation to the resonant frequency of the power converter. In practice, the duty cycle of each primary-side power switch is set to slightly less than 50% to avoid current shoot-through during switching transitions.

LLC converter 200 is coupled to an input voltage source VPFC, and includes controller 206 that regulates a power converter output characteristic such as an output voltage by regulating a switching frequency $f_s$ of the power converter. As shown, controller 206 senses the output voltage Vo of the power converter and a desired output voltage Vref and controls switching frequency $f_s$ of the primary-side power switches to regulate the output voltage Vo at the desired output voltage Vref. In the depicted embodiment, controller 206 directly senses output voltage Vo and generate primary-side switching signals LSdrive and HSdrive via an isolated driver 202 and synchronous rectifier switching signals SR1 and SR2 via synchronous rectifier driver 204. In alternative embodiments, output voltage Vo may be sensed using an isolated feedback circuit such as an opto-isolator, or other circuit, and the primary side switching signals LSdrive and HSdrive may be generated in the same power domain as controller 206.

The power converter provides power to a system or load 112 coupled to the output Vo. While in the illustrated embodiment, the power train employs a half-bridge resonant power converter topology, those skilled in the art should understand that other converter topologies such as an isolated resonant full-bridge power converter topology are well within the broad scope of the present invention.

In the primary side of the circuit, two series-coupled power switches, MOSFETs Q1 and Q2, are coupled to two inductors, resonant inductor $L_r$, the primary winding 210 of power transformer 208, and to capacitor $C_r$. Inductance $L_m$ represents the magnetizing inductance of transformer 208. It should be understood that the use of a MOSFET, specifically of an n-MOSFET to implement switching transistors Q1 and Q2 only an example. Any other switching component, such as a p-MOSFET, an IGBT (insulated gate bipolar transistor), a BJT (bipolar junction transistor), a JFET (junction field-effect transistor) or a GTO (Gate Turn-Off Thyristor) may be used as well. The same applies to other electronic switches that will be explained herein below.

In the secondary side of the circuit and MOSFETs Q3 and Q4, which function as synchronous rectifiers, are coupled to secondary windings 212 of transformer 208. Output inductor Lo couples the center tap of secondary winding 212 to load 112 and output capacitor Co. In alternative embodiments, MOSFETs Q3 and Q4 may be replaced by diodes. Output inductor Lo couples the center tap of secondary winding 212 to load 112 and output capacitor Co.

The resonant frequency of the LLC power train circuit topology is $f_{RES}$. The resonant frequency $f_{RES}$ can be estimated from the equation $$f_{RES} = \frac{1}{2\pi \times \sqrt{L_r \times C_r}},$$

where $L_r$ and $C_r$ are the inductance and capacitance respectively of the indicated primary-side power train circuit elements illustrated in FIG. 2.

Half bridge LLC resonant switched mode power converters are widely used due to their high conversion efficiency. Embodiment half bridge LLC resonant power converters may be configured to achieve zero voltage switching for primary side switches, and zero current switching for secondary side rectifiers under a wide input voltage range under different load conditions. However, in embodiments that employed a frequency controlled gain, frequency $f_s$ that corresponds to a no load condition may be theoretically infinite. In many conventional half-bridge LLC resonant power converters, the power converter is still operated in a first normal mode under no load or very light load conditions.

Figure 3A:
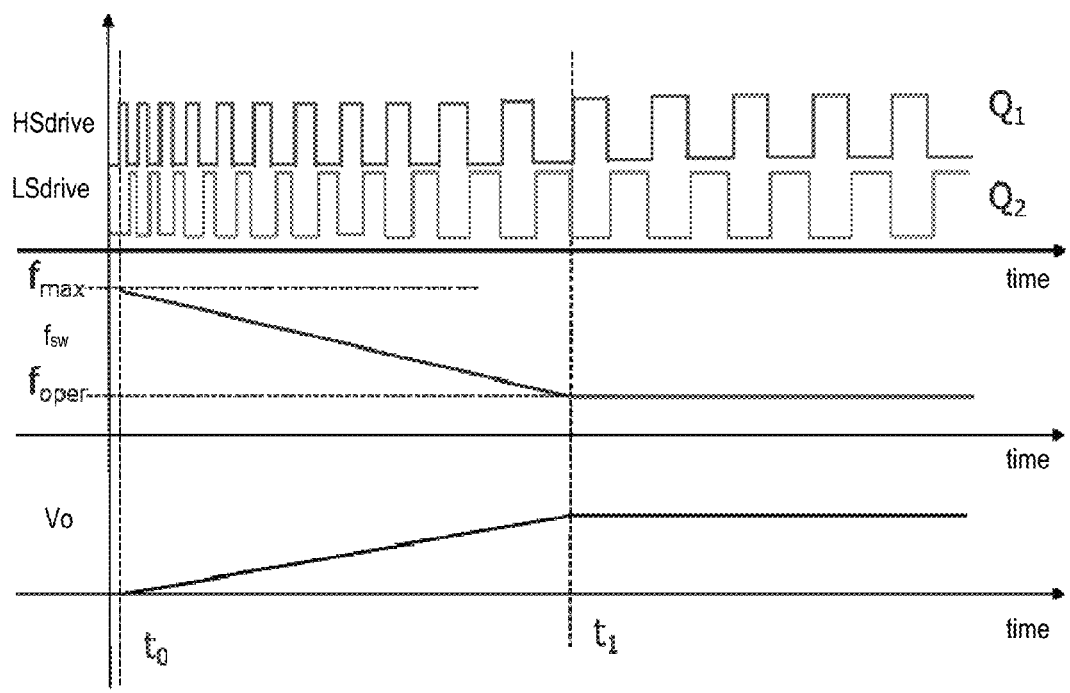
FIGS. 3a and 3b illustrate waveform diagrams of an exemplary resonant LLC power converter startup sequence.

FIG. 3*a* illustrates a waveform showing a conventional method of starting up a resonant LLC converter. Traces HSdrive and LSdrive represent switching signals for high-side switching transistor Q1 and low-side switching transistor Q2, respectively with respect to time; trace $f_{sw}$ represents the switching frequency of HSdrive and LSdrive with respect to time, and trace Vo represents the output voltage of LLC converter 200. As shown, frequency $f_{sw}$ initially starts at a high frequency $f_{max}$ when output voltage Vo is at zero and/or at a minimum voltage at time $t_0$. Between time $t_0$ and time $t_1$ the frequency $f_{sw}$ of HSdrive and LSdrive decrease over time until $f_{sw}$ reaches operating frequency $f_{oper}$. By starting the switching frequency at a high frequency, the output voltage is able to ramp up to a high voltage while the LLC converter operates in the inductive mode.

Figure 3B:
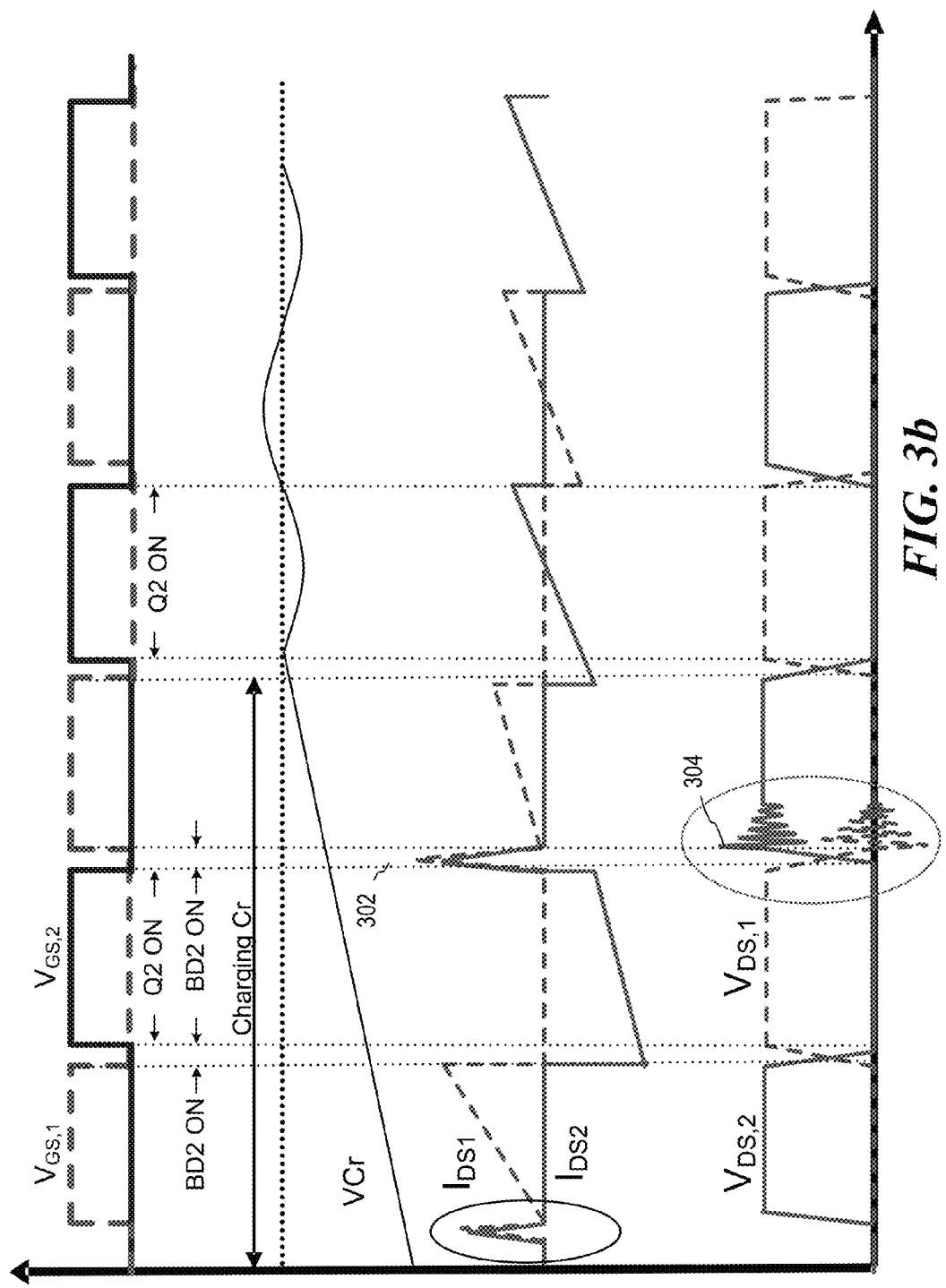

FIG. 3*b* illustrates a waveform diagram showing various signals associated with the startup operation of an LLC converter of FIG. 2 using switching signals having symmetric duty cycles, such as those shown in FIG. 3*a* with respect to signals HSdrive and LSdrive. As shown, the top set of waveforms in include the gate-source voltage $V_{GS,1}$ for high-side transistor Q1 shown in dashed lines and the gate-source voltage $V_{GS,2}$ for low-side transistor Q2 in solid lines. The time during which gate-source voltage $V_{GS,1}$ is high corresponds to when high-side transistor Q1 is on, and the time during which $V_{GS,2}$ is high corresponds to when the low-side Q2 is on. The trace labeled VCr represents the voltage across capacitor Cr of the LLC converter as the capacitor charges up, and the traces $I_{DS1}$ and $I_{DS2}$ represent the drain-source currents and traces $V_{DS,1}$ and $V_{DS,2}$ represent the drain-source voltages of transistors Q1 and Q2, respectively.

During the first cycle, when the gate-source voltage $V_{GS,1}$ of transistor Q1 goes high, series inductor Lr and the first winding 210 of transformer 208 begins to be magnetized when bus voltage VPFC is applied to these components via switching transistor Q1. Accordingly, the current $I_{DS,1}$ through switching transistor Q1 linearly increases according to:

$$I_{DS,1}(t) = \frac{VPFC - VCr(t)}{Lm + Lr} \cdot t,$$

where VPFC is the input voltage to the LLC converter, VCr(t) is the time dependent voltage across capacitor Cr, Lm is the inductance of the first winding of the transformer, Lr is the series inductor and t is the time. An expression for the source drain current of switching transistor Q2 is as follows:

$$I_{DS,2}(t) = \frac{VPFC - VCr(t)}{Lm + Lr} \cdot t_{on} + \frac{VCr(t) \cdot t}{Lm + Lr},$$

where $t_{on}$ is the length of time in seconds during which $V_{GS,1}$ is asserted.

As shown, after the first time that signal $V_{GS,2}$ is asserted, source drain current $I_{DS2}$ of low-side switching transistor Q2 is still conducting current in the reverse direction. Accordingly, the body diode of switching transistor Q2 is reverse-biased when switching signal $V_{GS,2}$ goes low. Once switching signal $V_{GS,1}$ turns on, the stored reverse recovery charge of the body diode of transistor Q2 is discharged, thereby causing a large and high di/dt current to be conducted through transistors Q1 and Q2 after time 302. This large current causes a corresponding voltage transient in the drain-source voltages $V_{DS,1}$ and $V_{VDS,2}$ in transistors Q1 and Q2. Under some conditions, the magnitude of this voltage may exceed a few hundred volts and may even exceed the breakdown voltage of transistors Q1 and Q2. In some cases, this voltage transient may cause device destruction and/or other reliability issues.

Figure 4A:
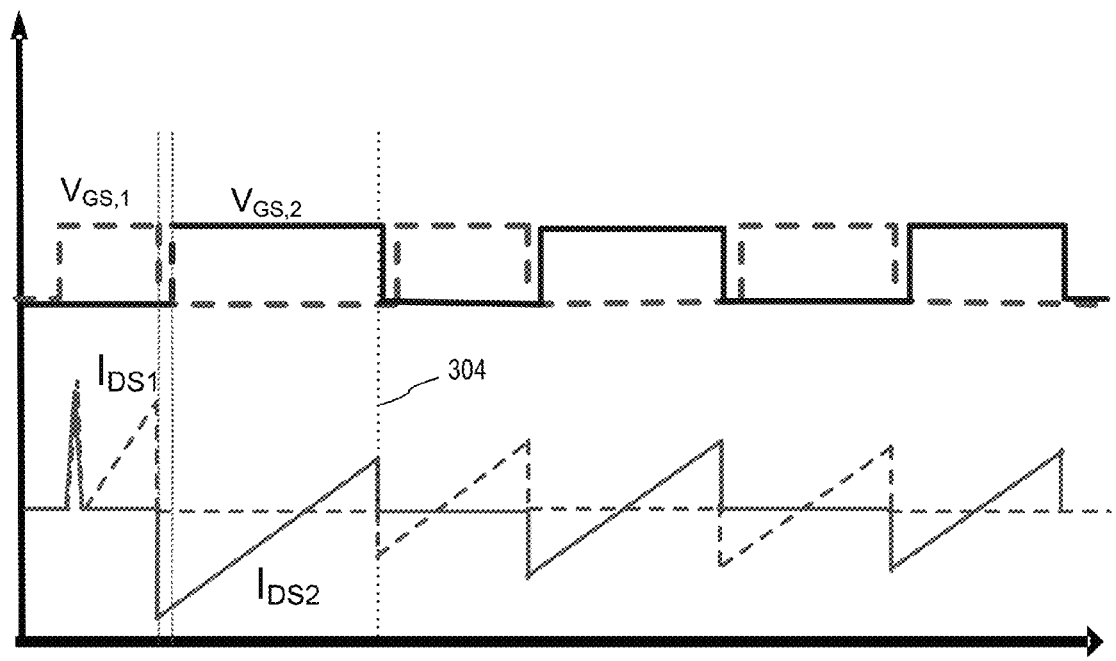
FIGS. 4a-4c illustrate waveform diagrams of embodiment resonant LLC power converter startup sequences.

FIG. 4*a* illustrates a waveform diagram of $V_{GS,1}$, $V_{GS,2}$, $I_{DS1}$, and $I_{DS2}$ using an embodiment control method in which transistors Q1 and Q2 are driven using asymmetric duty cycles. As shown, the pulse width of $V_{GS,1}$ is narrower than the pulse width of $V_{GS,2}$. Accordingly, when switching transistor Q2 is activated and a ground voltage is applied to the series combination of inductors Lr and Lm and capacitor Cr, current continues to increase until after the body diode of switching transistor Q2 becomes reverse biased. Accordingly, when the switching signal $V_{GS,2}$ coupled to Q2 is de-asserted, there is no reverse recovery charge. Accordingly, the large current and voltage transient seen in FIG. 3*b* when switching signal $V_{GS,2}$ is de-asserted at time 304 is not seen in FIG. 4*a*.

Figure 4B:
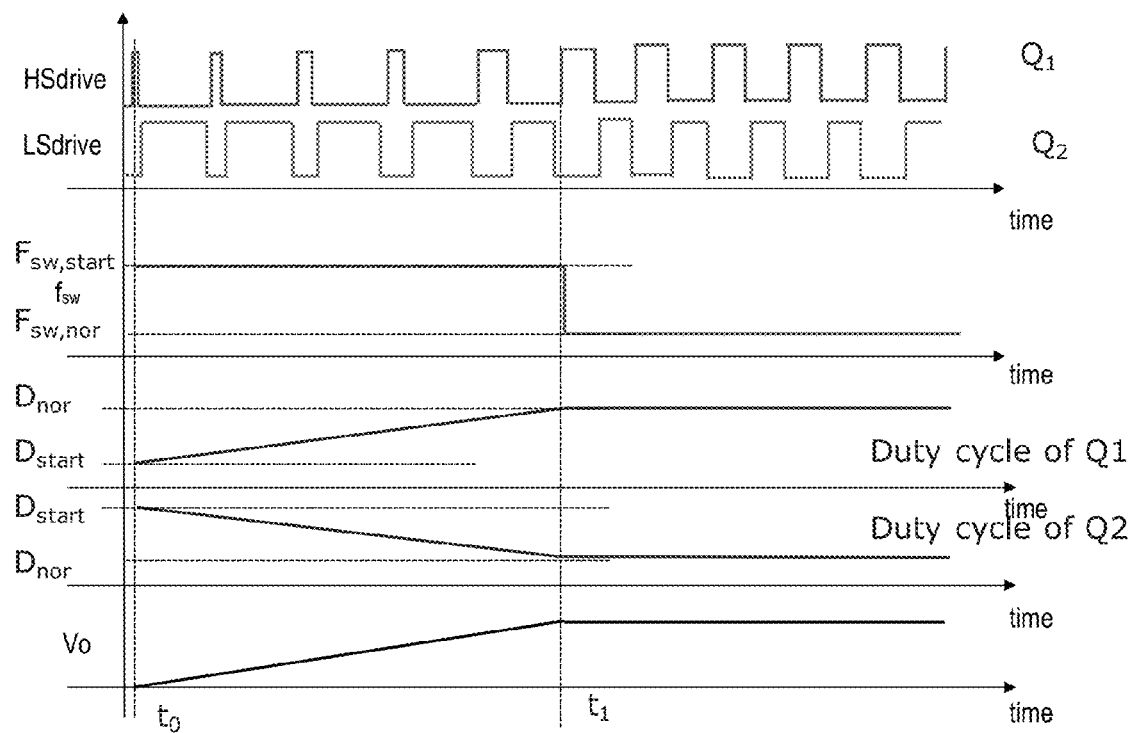
Figure 4C:
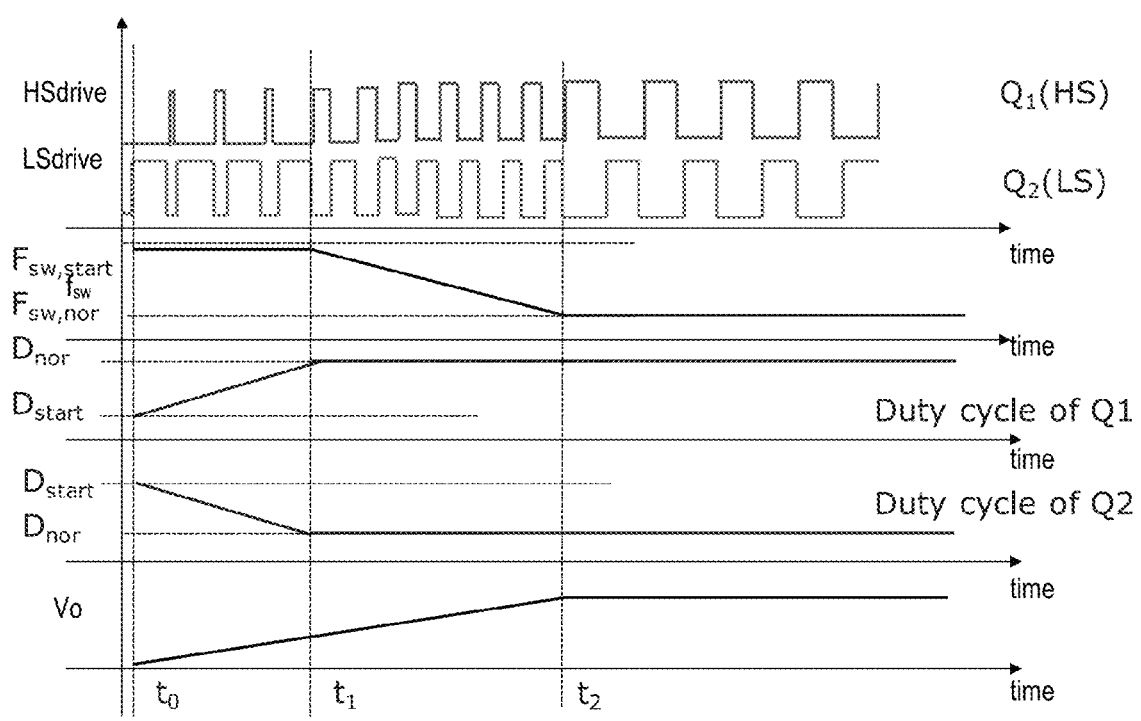

FIGS. 4*b* and 4*c* illustrate further waveform diagrams illustrating embodiment resonant LLC converter startup methods. As shown in FIG. 4*b*, high-side drive signal HSdrive initially starts out with a small duty cycle while low-side driver signal LSdrive initially starts out with a large duty cycle. Between times t0 and t1 when output voltage Vo is ramping up, the duty cycle of HSdrive progressively increases while the duty cycle of LSdrive progressively decreases. In one embodiment, these duty cycles progressively decrease/increase until a symmetric duty cycle used in a normal operating mode is reached at time t1. This nominal duty cycle may be about 50%, or slightly less to allow for a dead zone between assertions of HSdrive and LSdrive in order to prevent shoot through current by having both Q1 and Q2 activated simultaneously. In one example, the starting duty cycles for HSdrive and LSdrive may be between about 2% and about 20%. In one specific embodiment, 5% is used, however values outside of the range of 2% to 20% may be used depending on the particular embodiments and it specifications.

In some embodiments, the frequency of drive signals HSdrive and LSdrive may be adjusted during startup between times t0 and t1. In some embodiments, the switching frequency between times t0 and t1 may be a first constant frequency $F_{sw,start}$ followed by second constant frequency $F_{sw,nor}$ after time t1. $F_{sw,start}$ may be higher than $F_{sw,nor}$. For example, in one embodiment, $F_{sw,start}$ is about 200 KHz and $F_{sw,nor}$ is between about 50 KHz and about 100 KHz. Alternatively, other frequencies may be used. In an embodiment, the resonant LLC power converter operates in an open loop fashion between times t0 and t1, and then operates in a closed loop fashion after time t1. In some embodiments, time t1 is between about 5 ms and about 20 ms, for example, 13 ms. Alternatively, times outside of this range may be used depending on the particular embodiment and its specifications.

FIG. 4*c* illustrates a further waveform diagram of a further embodiment resonant LLC startup method. From time t0 to time t1, signals HSdrive and LSdrive are driven by asymmetric duty cycles as described above in order to ensure that the body diode of transistor Q2 is not reverse biased when drive signal LSdrive is de-asserted. As shown, the duty cycles of HSdrive and LSdrive are progressively ramped toward their nominal symmetric duty cycle values at time t1. However, between time t1 and t0, the frequency of HSdrive and LSdrive is set to the higher starting frequency of $F_{sw,start}$. Next, between time t1 and time t2, the frequency $f_{sw}$ of switching signals HSdrive and LSdrive is progressively lowered from $F_{sw,start}$ to the nominal operating frequency as output voltage Vo approaches its nominal output value. In an embodiment, the resonant LLC converter is operated in an open loop fashion between time t0 and time t2. After time t2, the resonant LLC converter is operated in a closed loop fashion.

Figure 5A:
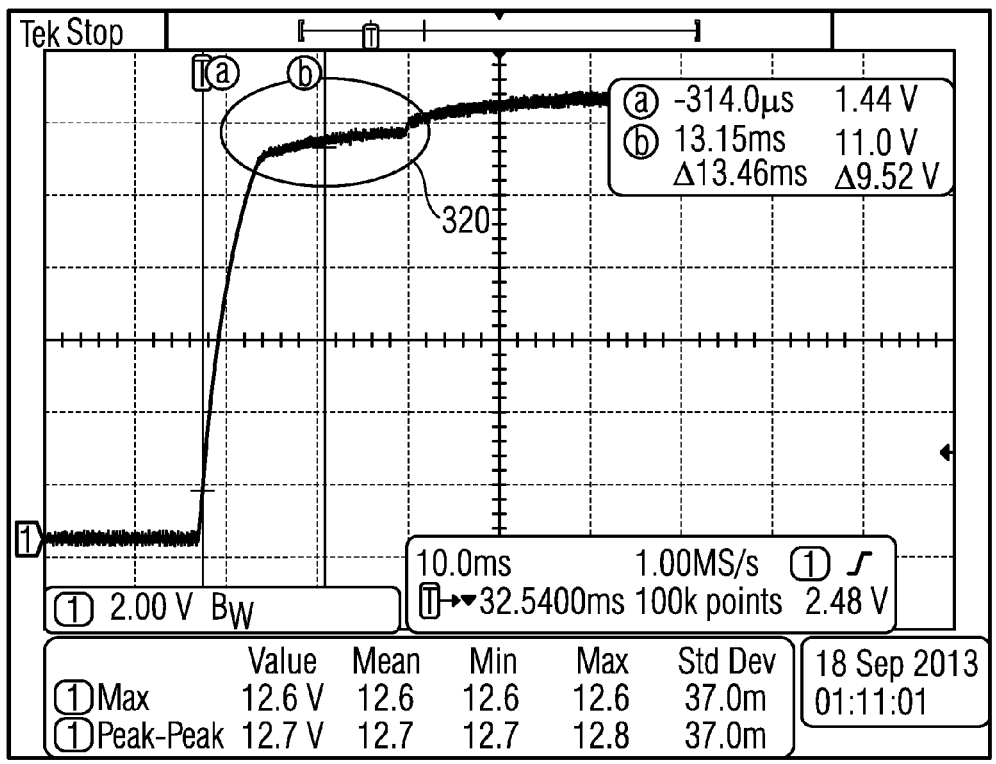
FIGS. 5a and 5b illustrate waveform diagrams illustrating the startup behavior of resonant LLC power converters.

FIG. 5*a* illustrates a waveform diagram showing the output voltage 320 of a resonant LLC converter during startup that is controlled according to the startup method illustrated in FIG. 3*a*. As shown, voltage 320 rises in two steps because the minimum voltage gain of a LLC converter is not zero. As the LLC converter starts up with a specified input voltage VPFC, the output voltage ramps up immediately. A step in voltage occurs once the LLC converters without any pulse width modulation (PWM) control.

Figure 5B:
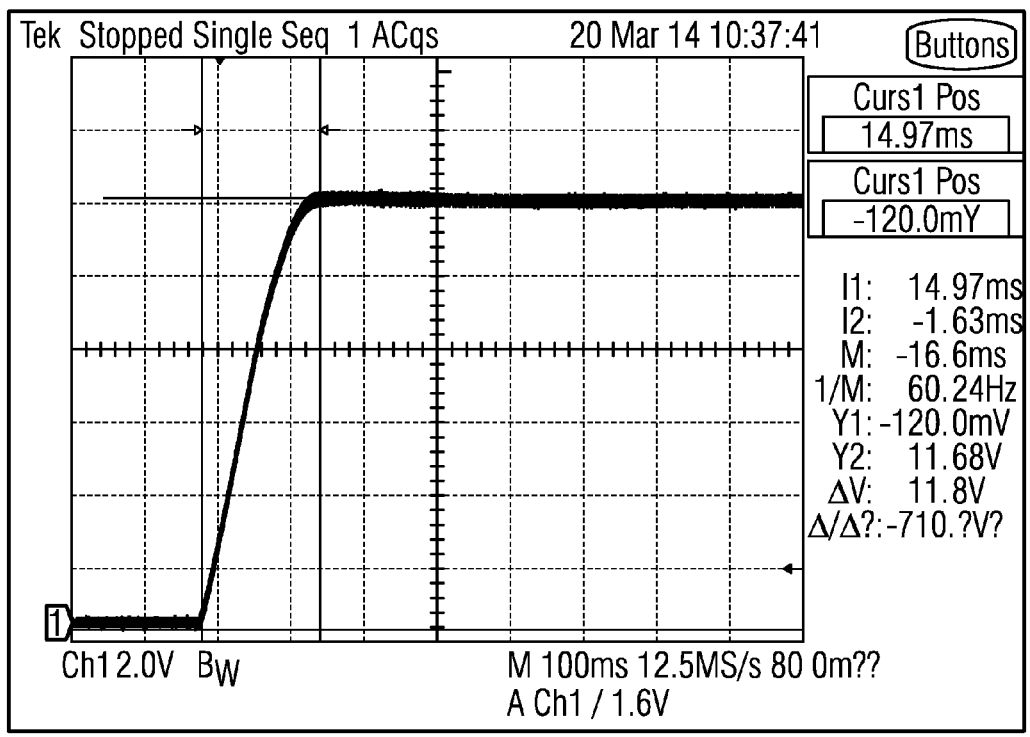

FIG. 5*b* illustrates a waveform diagram showing the output voltage of a resonant LLC converter during startup that is controlled according to the embodiment startup method illustrated in FIGS. 4*a-c*. As shown the expected output voltage ramps up linearly within specified time may because the asymmetric duty cycle is initially narrower prior to the control loop being closed. Once the loop is closed, the total energy amount transferred from primary side to output load is under PWM control.

Figure 6:
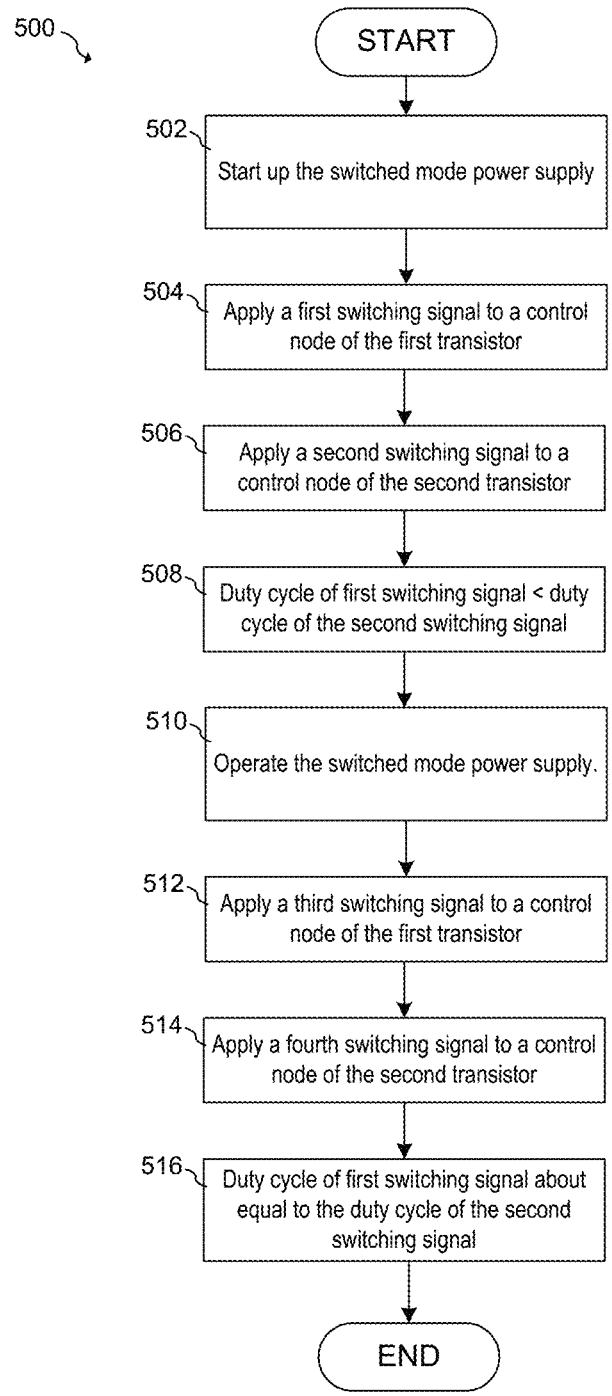
FIG. 6 illustrates a flowchart of an embodiment method.

FIG. 6 illustrates a block diagram of an embodiment method 500 of operating a switched-mode power supply such as a resonant LLC power converter having a first switching transistor coupled between a power input node and an inductor driving node, and a second switching transistor coupled between a reference node and the inductor driving node. In step 502, a startup sequence is initiated within the power supply. In steps 504 and 506, a first switching signal is applied to a control node of the first switching transistor and a second switching signal is applied to a control node of a second switching transistor. In step 508, the duty cycle of the first switching signal is made to be less than the switching cycle of the second switching signal. In some embodiments the duty cycle of the first switching signal and the second switching signal are made to be asymmetric to the point where the body diode of the second switching transistor is reverse biased when the second switching transistor is activated by the second switching signal. In some embodiments, the duty cycles of the first switching signal and the second switching signals are complementary. For example, if the duty cycle of the first switching signal is about 10%, the duty cycle of the second switching signal is about 90%. In other words, the duty cycle of the second switching signal is about one minus the duty cycle of the first switching signal. In some embodiment, the sum of the duty cycles of the first switching signal and the second switching signal may not add to 100% in order to provide a dead zone between the times that the first switching transistor is activated and the times that the second switching transistor is activated.

In step 510, the resonant LLC power converter commences a normal operating mode by applying a third switching signal to the control node of the first switching transistor in step 512 and applying a fourth switching signal to the control node of the second switching transistor in step 514. In step 516, a duty cycle of the third switching signal is made to be substantially equal and/or made to be symmetric with the duty cycle of the fourth switching signal. In some embodiments, the duty cycle of the third and fourth switching signals is about 50%. In some embodiments that employ dead zones, the duty cycles of the third and fourth switching signal is slightly less than 50%.

Figure 7:
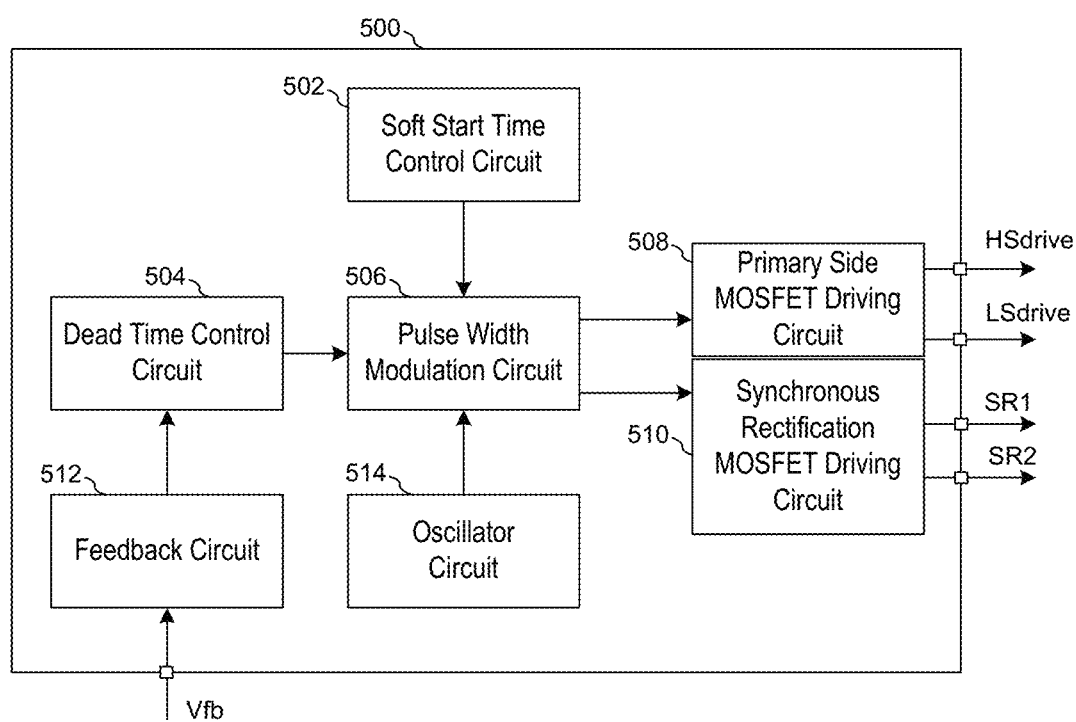
FIG. 7 illustrates a block diagram of an embodiment integrated circuit.

FIG. 7 illustrates an embodiment power supply integrated circuit 500 that may be used to control an embodiment resonant LLC power converter. Integrated circuit 500 includes pulse width modulation circuit 506 that generates switching signals for the primary side MOSFET driving circuit 508 and for synchronous rectification MOSFET driving circuit 510. Pulse width modulation circuit produces switching signals for these blocks in accordance with systems and methods known in the art. Primary side MOSFET driving circuit 508 produces high-side switching signal HSdrive and low-side switching signal LSdrive that may be coupled to transistors Q1 and Q2 shown in FIG. 2 using driver circuits known in the art. Similarly, synchronous rectification MOSFET driving circuit 510 produces switching signals SR1 and SR2 that may be coupled to transistors Q4 and Q3 illustrated in FIG. 2 using driver circuits known in the art. In alternative embodiments primary side MOSFET driving circuit 508 and/or synchronous rectification MOSFET driving circuit 510 may be implemented externally.

Oscillator circuit 514 provides a clock signal for use by pulse width modulation circuit 506, and dead time control circuit 504 controls the dead time between the assertion of high-side switching signal HSdrive and low-side switching signal LSdrive. Feedback circuit 512 may be coupled to feedback signal Vfb that is coupled to the output voltage of the power supply. Feedback voltage Vfb may be equal to the output voltage, or may be proportional to the output voltage. In some embodiments, feedback voltage Vfb produced by an external isolation circuit such as an opto-coupler or a transformer.

Soft Start Time control circuit 502, which is coupled to the pulse width modulation circuit, is configured to implement startup methods as disclosed herein. In some embodiments, the soft start time control is implemented in an analog manner using an RC circuit. For example, the soft start time may be determined by charging a capacitor to a specified voltage. Alternatively, digital methods may be used. For example, the total soft start time may be determined by counting a total number of pulses of a specified pulse frequency.

In accordance with an embodiment, a switched-mode power supply has a first switching transistor coupled between a power input node and an inductor driving node, and a second switching transistor coupled between a reference node and the inductor driving node. A method of operating the switched-mode power supply includes starting up the switched-mode power supply including applying a first switching signal to a control node of the first switching transistor, and a second switching signal to a control node of the second switching transistor, where a duty cycle of the first switching signal is less than a duty cycle of the second switching signal. After starting up the switched mode power supply, the switched mode power supply is operated by applying a third switching signal to the control node of the first switching transistor and a fourth switching signal to the control node of the second switching transistor, where a duty cycle of the third switching signal is substantially equal to a duty cycle of the fourth switching signal.

In an embodiment, the method further includes applying a dead zone between the first switching signal and the second switching signal, and between the third switching signal and the fourth switching signal, where the first switching transistor and the second switching transistor are not simultaneously on. Operating the switched-mode power supply may further include driving a primary side of a resonant switched mode converter. In some embodiments, the resonant converter includes an inductor-inductor-capacitor (LLC) converter. Operating the switched mode power supply may further include driving a capacitor coupled in series with a winding of a transformer. In some embodiments, the first switching signal and the second switching signal include a first switching frequency, the third switching signal and the fourth switching signal include a second switching frequency, and the first switching frequency is greater than the second switching frequency. The first switching frequency may be greater than 175 kHz, and the second switching frequency may be less than 125 kHz.

In an embodiment, the method further includes ramping the duty cycle of the first switching signal and the duty cycle of the second switching signal to a nominal value during the step of starting up the switched mode power supply. The method may further include ramping a frequency of the first switching signal and the second switching signal from a first initial value to a final nominal value during the step of starting up the switched mode power supply, where the first initial value is higher than the final nominal value.

In an embodiment, starting up the switched-mode power supply includes, during a first time period, ramping a frequency of the first switching signal and the second switching signal from a first initial value to a final nominal value during the step of starting up the switched mode power supply, where the first initial value is higher than the final nominal value. During a second time period after the first time period, a frequency of the first switching signal and the second switching signal is ramped from a first initial value to a final nominal value during the step of starting up the switched mode power supply, where the first initial value is higher than the final nominal value.

In accordance with a further embodiment, a power supply circuit includes a controller configured to be coupled to control nodes of a first switching transistor coupled between a power input node and an inductor driving node, and a second switching transistor coupled between a reference node and the inductor driving node. The controller is configured to apply a first switching signal to the control node of the first switching transistor and apply a second switching signal to the control node of the second switching transistor during a first operational mode, where a duty cycle of the first switching signal is less than a duty cycle of the second switching signal. The controller also configured to apply a third switching signal to the control node of the first transistor and apply a fourth switching signal to the control node of the second transistor during a second operational mode different from the first operational mode, where a duty cycle of the third switching signal is substantially equal to a duty cycle of the fourth switching signal.

In an embodiment, a pulse width of the second switching signal is long enough to allow a body diode of the second switching transistor to be reverse biased at an end of a switching pulse of the second switching signal. The controller may be further configured to apply a dead zone between the first switching signal and the second switching signal, and between the third switching signal and the fourth switching signal, where the first switching transistor and the second switching transistor are not simultaneously on. In some embodiments, the controller is disposed on an integrated circuit.

The power supply circuit may further include the first switching transistor and the second switching transistor. In some embodiments, the first switching signal and the second switching signal include a first switching frequency, the third switching signal and the fourth switching signal includes a second switching frequency, and the first switching frequency is greater than the second switching frequency. In some embodiments, the first switching frequency is greater than 175 kHz, and the second switching frequency is less than 125 kHz.

In accordance with a further embodiment, a resonant switched-mode power supply includes a half bridge having inputs coupled to a power input node and a reference node, and an output coupled to an inductor driver node; a primary-side circuit coupled to the inductor driver node, the primary-side circuit including a capacitor coupled in series with a first winding of a transformer; a secondary-side circuit coupled to an output port, the secondary-side circuit including a rectifier coupled in series with a secondary winding of the transformer; and a controller having a outputs coupled to a control node of the half-bridge. In an embodiment, the controller is configured to start up the switched-mode power supply by applying a first switching signal to the control node of the half bridge. The first switching signal includes a first duty cycle. After starting up the switched mode power supply, operate the switched mode power supply is operated in a normal operation mode by applying a second switching signal to the control node of the half-bridge, where the second switching signal includes a second duty cycle greater than the first duty cycle.

In an embodiment, the first switching signal includes a first switching frequency, the second switching signal includes a second switching frequency, and the first switching frequency is greater than the second switching frequency. In some embodiments, the first switching frequency is greater than 175 kHz, and the second switching frequency is less than 125 kHz.

In an embodiment, the resonant switched-mode power supply further includes a series inductor coupled in series with the capacitor and the first winding of the transformer. The half-bridge may include a high-side transistor and a low-side transistor.

Advantages of some embodiments include the ability to start-up a resonant LLC power converter without encountering a high current transient due to uncompleted reverse recovery of a switching transistor body diode. A further advantage of some embodiments includes the ability to start-up a resonant switched mode power supply with a smooth increase in output voltage.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of intraoperative hardware units, including one or more processors as described above, in conjunction with suitable software and/or firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply having a first switching transistor coupled between a power input node and an inductor driving node, and a second switching transistor coupled between a reference node and the inductor driving node, the method comprising:
   starting up the switched-mode power supply comprising applying a first switching signal to a control node of the first switching transistor, and a second switching signal to a control node of the second switching transistor, wherein a duty cycle of the first switching signal is less than a duty cycle of a third switching signal, and wherein a duty cycle of the second switching signal is greater than a duty cycle of a fourth switching signal; and
   after starting up the switched-mode power supply, operating the switched-mode power supply comprising applying the third switching signal to the control node of the first switching transistor and the fourth switching signal to the control node of the second switching transistor, wherein a duty cycle of the third switching signal is substantially equal to a duty cycle of the fourth switching signal.

2. The method of claim 1, further comprising applying a dead zone between the first switching signal and the second switching signal, and between the third switching signal and the fourth switching signal, wherein the first switching transistor and the second switching transistor are not simultaneously on.

3. The method of claim 1, wherein operating the switched-mode power supply comprises driving a primary side of a resonant switched-mode converter.

4. The method of claim 3, wherein the resonant switched-mode converter comprises an inductor-inductor-capacitor (LLC) converter.

5. The method of claim 1, wherein operating the switched-mode power supply comprises driving a capacitor coupled in series with a winding of a transformer.

6. The method of claim 1, wherein the first switching signal and the second switching signal comprise a first switching frequency, the third switching signal and the fourth switching signal comprise a second switching frequency, and the first switching frequency is greater than the second switching frequency.

7. The method of claim 6, wherein the first switching frequency is greater than 175 KHz, and the second switching frequency is less than 125 KHz.

8. The method of claim 1, further comprising ramping the duty cycle of the first switching signal and the duty cycle of the second switching signal to a nominal value during the step of starting up the switched-mode power supply.

9. The method of claim 1, further comprising ramping a frequency of the first switching signal and the second switching signal from a first initial value to a final nominal value during the step of starting up the switched-mode power supply, wherein the first initial value is higher than the final nominal value.

10. The method of claim 1 wherein starting up the switched-mode power supply comprises:
    during a first time period, ramping the duty cycle of the first switching signal from a first initial duty cycle value to a final nominal duty cycle value during the step of starting up the switched-mode power supply, wherein the first initial duty cycle value is lower than the final nominal duty cycle value; and
    during a second time period after the first time period, ramping a frequency of the first switching signal and the second switching signal from a first initial frequency value to a final nominal frequency value during the step of starting up the switched-mode power supply, wherein the first initial frequency value is higher than the final nominal frequency value.

11. The method of claim 1, wherein an output voltage of the switched-mode power supply is zero before the starting up the switched-mode power supply.

12. The method of claim 10, wherein the starting up the switched-mode power supply further comprises during the first time period, ramping the duty cycle of the second switching signal from a second initial duty cycle value to a second final nominal duty cycle value during the step of starting up the switched-mode power supply, wherein the second initial duty cycle value is higher than the second final nominal duty cycle value.

13. A power supply circuit comprising:
    a controller configured to be coupled to a control node of a first switching transistor coupled between a power input node and an inductor driving node and a second control node of a second switching transistor coupled between a reference node and the inductor driving node, the controller configured to
    apply a first switching signal to the control node of the first switching transistor and apply a second switching signal to the control node of the second switching transistor during a first operational mode, wherein a duty cycle of the first switching signal is less than a duty cycle of a third switching signal, and wherein a duty cycle of the second switching signal is greater than a duty cycle of a fourth switching signal, and
    apply the third switching signal to the control node of the first switching transistor and apply the fourth switching signal to the control node of the second switching transistor during a second operational mode different from the first operational mode, wherein a duty cycle of the third switching signal is substantially equal to a duty cycle of the fourth switching signal.

14. The power supply circuit of claim 13, wherein a pulse width of the second switching signal is long enough to allow a body diode of the second switching transistor to be reverse biased at an end of a switching pulse of the second switching signal.

15. The power supply circuit of claim 13, wherein the controller is further configured to apply a dead zone between the first switching signal and the second switching signal, and between the third switching signal and the fourth switching signal, wherein the first switching transistor and the second switching transistor are not simultaneously on.

16. The power supply circuit of claim 13, wherein the controller is disposed on an integrated circuit.

17. The power supply circuit of claim 13, further comprising the first switching transistor and the second switching transistor.

18. The power supply circuit of claim 13, wherein the first switching signal and the second switching signal comprise a first switching frequency, the third switching signal and the fourth switching signal comprises a second switching frequency, and the first switching frequency is greater than the second switching frequency.

19. The power supply circuit of claim 18, wherein the first switching frequency is greater than 175 KHz, and the second switching frequency is less than 125 KHz.

20. A resonant switched-mode power supply comprising:
a half-bridge having inputs coupled to a power input node and a reference node, and an output coupled to an inductor driver node;
a primary-side circuit coupled to the inductor driver node, the primary-side circuit comprising a capacitor coupled in series with a first winding of a transformer;
a secondary-side circuit coupled to an output port, the secondary-side circuit comprising a rectifier coupled in series with a secondary winding of the transformer; and
a controller having outputs coupled to a first control node and a second control node of the half-bridge, the controller configured to
start up the resonant switched-mode power supply by applying a first switching signal to the first control node of the half-bridge and applying a second switching signal to the second control node of the half-bridge, the first switching signal comprising a first duty cycle and the second switching signal comprising a second duty cycle; and
after starting up the resonant switched-mode power supply, operate the resonant switched-mode power supply in a normal operation mode by applying a third switching signal to the first control node of the half-bridge and a fourth switching signal to the second control node of the half-bridge, the third switching signal comprising a third duty cycle greater than the first duty cycle and the fourth switching signal comprising a fourth duty cycle less than the second duty cycle, wherein the third duty cycle is substantially equal to the fourth duty cycle.

21. The resonant switched-mode power supply of claim 20, wherein the first switching signal comprises a first switching frequency, the second switching signal comprises a second switching frequency, and the first switching frequency is greater than the second switching frequency.

22. The resonant switched-mode power supply of claim 21, wherein the first switching frequency is greater than 175 KHz, and the second switching frequency is less than 125 KHz.

23. The resonant switched-mode power supply of claim 20, further comprising a series inductor coupled in series with the capacitor and the first winding of the transformer.

24. The resonant switched-mode power supply of claim 20, wherein the half-bridge comprises a high-side transistor and a low-side transistor.

* * * * *